(12) United States Patent
Sano

(10) Patent No.: US 11,938,760 B2
(45) Date of Patent: Mar. 26, 2024

(54) PNEUMATIC TIRE

(71) Applicant: Toyo Tire Corporation, Itami (JP)

(72) Inventor: Shingo Sano, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/714,212

(22) Filed: Apr. 6, 2022

(65) Prior Publication Data
US 2022/0339973 A1 Oct. 27, 2022

(30) Foreign Application Priority Data

Apr. 26, 2021 (JP) ................................ 2021-073865

(51) Int. Cl.
*B60C 13/02* (2006.01)
*B60C 13/00* (2006.01)

(52) U.S. Cl.
CPC ............ *B60C 13/02* (2013.01); *B60C 13/002* (2013.01)

(58) Field of Classification Search
CPC ........ B60C 13/02; B60C 13/002; B60C 11/01
USPC ....................................................... D12/605
See application file for complete search history.

(56) References Cited

U.S. PATENT DOCUMENTS

D895,535 S * 9/2020 Jiang ............................ D12/605
D959,358 S * 8/2022 Davenport ................... D12/512
2017/0197474 A1 7/2017 Ishigaki
2018/0065415 A1 * 3/2018 Sakamoto ............... B60C 11/01
2019/0270343 A1 * 9/2019 Notsu .................... B60C 13/002
2020/0406688 A1 * 12/2020 Iwamoto ............... B60C 13/004

FOREIGN PATENT DOCUMENTS

| CN | 110217053 A | | 9/2019 |
|----|---|---|---|
| CN | 112124008 A | | 12/2020 |
| JP | 2017-121876 A | | 7/2017 |
| JP | 2020045075 A | * | 3/2020 |
| JP | 2021-3948 A | | 1/2021 |

OTHER PUBLICATIONS

Machine translation JP 2020-045075 (Year: 2020).*
Office Action dated Dec. 27, 2023, issued in counterpart CN application No. 202210341677.6, with English translation. (22 pages).

* cited by examiner

*Primary Examiner* — Justin R Fischer
*Assistant Examiner* — Wendy L Boss
(74) *Attorney, Agent, or Firm* — WHDA, LLP

(57) ABSTRACT

A pneumatic tire includes a sidewall extending in a tire radial direction, the sidewall comprises a first side block which protrudes outwardly in a tire axial direction, the first side block comprises a first region which is arranged at an inwardmost location in the tire radial direction of the first side block, a second region which is contiguous with a location toward an exterior in the tire radial direction of the first region, and a third region which is contiguous with a location toward an exterior in the tire radial direction of the second region, the second region protrudes more than the first region, and the third region protrudes more than the second region.

19 Claims, 7 Drawing Sheets

PNEUMATIC TIRE

CROSS REFERENCE TO RELATED APPLICATIONS

This application claims the benefit of priority of Japanese application no. 2021-73865, filed on Apr. 26, 2021, which is incorporated herein by reference.

BACKGROUND OF THE INVENTION

Field of the Invention

The present disclosure relates to a pneumatic tire.

Description of the Related Art

Conventionally a pneumatic tire might, for example, comprise a sidewall extending in the tire radial direction, and the sidewall might comprise a side block protruding toward the exterior in the tire axial direction (e.g., JP2017-121876A and JP2021-3948A). In addition, the side block permits improvement in terms of performance with respect to traction (e.g., ability of side block surface and/or edge components to produce traction when in contact with snow, mud, sand, rock, and/or the like).

It so happens that when the vehicle is being driven on a snowy road or under bad road conditions (e.g., over muddy, sandy, or rocky terrain), it may be the case that snow, earth (sand, mud, etc.), or other such foreign object(s) will adhere to a side block. In addition, where a foreign object continues to adhere to a side block, e.g., when the vehicle is being driven on a snowy road or under bad road conditions, it may be the case that this will make it impossible to adequately achieve performance with respect to traction.

SUMMARY OF THE INVENTION

It is an object of the present disclosure to provide a pneumatic tire that suppresses occurrence of situations in which a foreign object might otherwise continue to adhere to a side block.

There is provided a pneumatic tire comprises a sidewall extending in a tire radial direction;

wherein the sidewall comprises a first side block which protrudes outwardly in a tire axial direction;

wherein the first side block comprises a first region which is arranged at an inwardmost location in the tire radial direction of the first side block, a second region which is contiguous with a location toward an exterior in the tire radial direction of the first region, and a third region which is contiguous with a location toward an exterior in the tire radial direction of the second region;

wherein the second region protrudes more than the first region; and wherein the third region protrudes more than the second region.

DETAILED DESCRIPTION OF THE INVENTION

Below, an embodiment of a pneumatic tire is described with reference to FIG. 1 through FIG. 7. At the respective drawings, note that dimensional ratios at the drawings and actual dimensional ratios are not necessarily consistent, and note further that dimensional ratios are not necessarily consistent from drawing to drawing.

Note that the respective dimensions, positional relationships, relative magnitudes, and so forth that are indicated below should be understood to be as measured under normal conditions when the pneumatic tire (hereinafter also referred to as simply "tire") 1 mounted on a normal rim and inflated to normal internal pressure is under no load. A normal rim is that particular rim which is specified for use with a particular tire 1 in the context of the body of standards that contains the standard that applies to the tire 1 in question, this being referred to, for example, as a standard rim in the case of JATMA, or a measuring rim in the cases of TRA and ETRTO.

Furthermore, normal internal pressure is that air pressure which is specified for use with a particular tire 1 in the context of the body of standards that contains the standard that applies to the tire 1 in question, this being "maximum air pressure" in the case of JATMA, the maximum value listed at the table entitled "Tire Load Limits at Various Cold Inflation Pressures" in the case of IRA, or "inflation pressure" in the case of ETRTO.

At the respective drawings, first direction D1 is the tire axial direction D1 which is parallel to the tire rotational axis, second direction D2 is the tire radial direction D2 which is the direction of the diameter of tire 1, and third direction D3 is the tire circumferential direction D3 which is the direction that is circumferential with respect to the rotational axis of the tire. Furthermore, tire equatorial plane S1 refers to a plane that is located centrally in the tire axial direction D1 and that is perpendicular to the rotational axis of the tire; tire meridional planes S2 through S5 refer to planes that are perpendicular to tire equatorial plane S1 and that contain the rotational axis of the tire.

In the tire axial direction D1, note that toward the interior means nearer to tire equatorial plane S1, and note that toward the exterior means farther away from tire equatorial plane S1. Furthermore, in the tire radial direction D2, note that toward the interiormeans nearer to the tire rotational axis, and toward the exterior means farther away from the tire rotational axis. Furthermore, the tire circumferential direction D3 may be further subdivided into first side D31, which is also referred to as first circumferential direction side D31; and second side D32, which is also referred to as second circumferential direction side D32.

Figure 1:
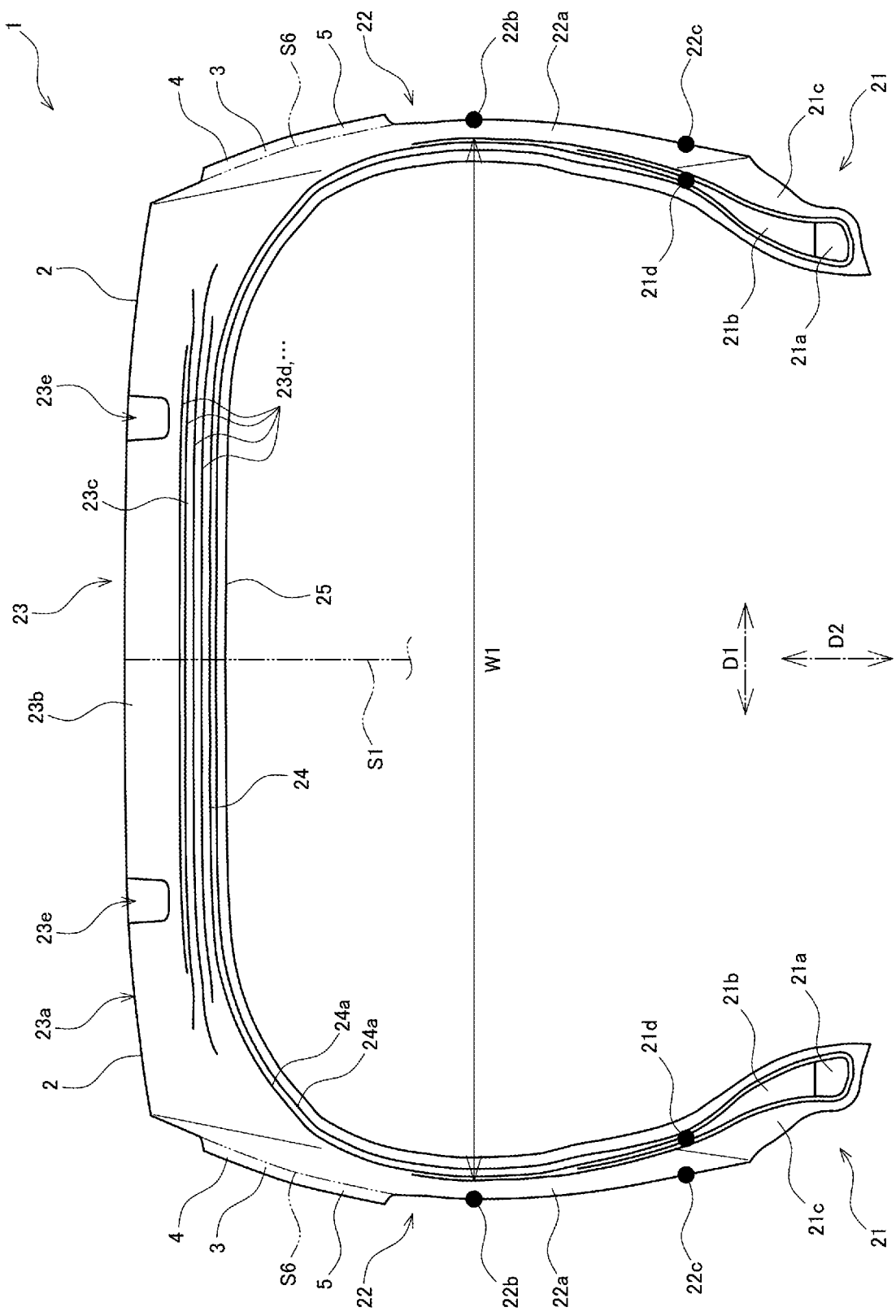
FIG. 1 is a view of a section, taken along a tire meridional plane, of the principal components in a pneumatic tire associated with an embodiment.

As shown in FIG. 1, for example, tire 1 may comprise a pair of bead regions 21; sidewalls 22 which extend outwardly in the tire radial direction D2 from the respective bead regions 21; and tread 23 which is contiguous with the respective outer ends in the tire radial direction D2 of the pair of sidewalls 22, 22 and which has tread surface 23*a* that contacts the road surface toward the exterior in the tire radial direction D2. Note that tire 1 may, for example, be mounted on a rim (not shown).

For example, Bead region 21 may comprise bead core 21a which is formed so as to be annular in shape, and bead filler 21b which is arranged toward the exterior in the tire radial direction D2 from bead core 21a. For example, bead core 21a might be formed by laminating rubber-covered bead wires (e.g., metal wires), and bead filler 21b might be formed from hard rubber that has been made to taper as one proceeds toward the exterior in the tire radial direction D2.

Furthermore, for example, tire 1 may comprise carcass suspended between pair of bead cores 21a, 21a; and innerliner 25 that is arranged toward the interior from carcass 24 and that faces the interior space of tire 1 which is or will be filled with air. For example, carcass 24 and innerliner 25 may be arranged in parallel fashion with respect to the inside circumferential surface of the tire over a portion thereof that encompasses bead regions 21, sidewalls 22, and tread 23.

For example, bead region 21 may comprise rim strip rubber 21c which is arranged toward the exterior in the tire axial direction D1 from carcass 24 and which is intended to constitute the outer surface that will come in contact with the rim. Further, for example, sidewall 22 may comprise sidewall rubber 22a which is arranged toward the exterior in the tire axial direction D1 from carcass 24 and which is intended to constitute the outer surface.

For example, tread 23 may comprise tread rubber 23b which constitutes tread surface 23a, and belt 23c which is arranged between tread rubber 23b and carcass 24. Belt 23c may comprise a plurality (four at FIG. 1) belt plies 23d. For example, belt plies 23d might comprise a plurality of belt cords (e.g., organic fiber and/or metal) which are arrayed in parallel fashion, and topping rubber with which the belt cords are covered.

Carcass 24 may be made up of at least one (two at FIG. 1) carcass ply 24a. For example, carcass ply 24a may fold back upon itself and wraps about bead core 21a so as to envelop bead core 21a. Furthermore, for example, carcass ply 24a may comprise a plurality of ply cords (e.g., organic fiber and/or metal) which are arrayed in directions more or less perpendicular to the tire circumferential direction D3, and topping rubber with which the ply cords are covered.

Innerliner 25 may have superior functionality in terms of its ability to impede passage of gas therethrough so as to permit air pressure to be maintained. The constitution at sidewall 22 may be such that, as is the case in the present embodiment, innerliner 25 is in intimate contact with the inside circumferential surface of carcass 24, there being no other member that intervenes between innerliner 25 and carcass 24.

Furthermore, distance between the inside circumferential surface of the tire (inside circumferential surface of innerliner 25) and the carcass ply 24a which is arranged nearest to the inside circumferential surface might, for example, be made to be 90% to 180% at sidewall 22 of what it is at tread 23. Furthermore, this distance might, for example, be made to be 120% to 160% at sidewall 22 of what it is at tread 23.

Provided at the outer surface of sidewalls 22 are locations 22b which are at the same locations in the tire radial direction D2 as the locations at which tire width is a maximum (more specifically, the locations at which distance W1 between respective exterior points in the tire axial direction D1 of carcass 24 is a maximum). Below, these locations 22b are referred to as tire maximum width locations 22b.

Furthermore, provided at the outer surface of sidewalls 22 are locations 22c which are at the same locations in the tire radial direction D2 as outer ends 21d in the tire radial direction D2 of bead filler 21b. Below, these locations 22c are referred to as bead end locations 22c.

Figure 2:
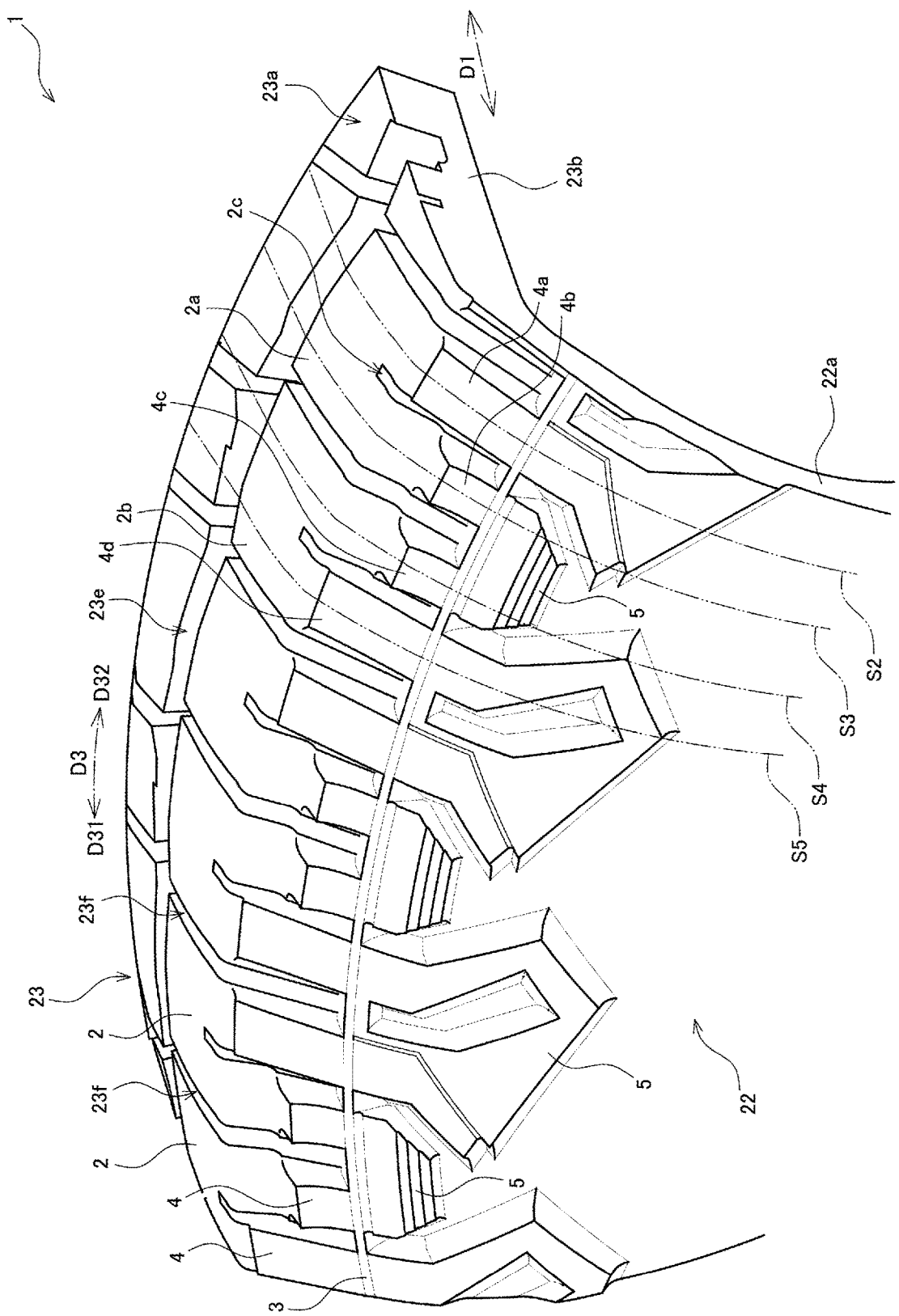
FIG. 2 is a perspective view of the principal components in a pneumatic tire associated with same embodiment.

As shown in FIG. 1 and FIG. 2, tread rubber 23b may comprise a plurality of main grooves 23e that extend continuously in the tire circumferential direction D3 along the entire length in the tire circumferential direction D3 of tread surface 23a. In addition, tread rubber 23b may comprise a plurality of width grooves 23f which extend from a main groove 23e which is arranged in outermost fashion in the tire axial direction D1 (sometimes referred to as "shoulder main groove") to an outer end in the tire axial direction D1, and a plurality of tread blocks 2 which are partitioned by shoulder main groove 23e and plurality of width grooves 23f.

As shown in FIG. 2, sidewall rubber 22a may, e.g., as is the case in the present embodiment, comprise annular projection 3 which protrudes toward the exterior in the tire axial direction D1, and buttress block 4 which protrudes toward the exterior in the tire axial direction D1. Furthermore, it is preferred, e.g., as is the case in the present embodiment, that sidewall rubber 22a comprise side block 5 which protrudes toward the exterior in the tire axial direction D1.

Annular projection 3 might, for example, extend continuously in the tire circumferential direction D3 along the entire length in the tire circumferential direction D3 of sidewall rubber 22a. The dimension in the tire radial direction D2 of annular projection 3 might, for example, be constant (here and below understood to mean not only the situation in which this is the same but to also include situations in which this is approximately the same such that there is a difference of ±10% thereat) all along the tire circumferential direction D3. Furthermore, the height by which annular projection 3 protrudes might, for example, be constant all along the tire circumferential direction D3.

Pluralities of buttress blocks 4 and of side blocks 5 might, for example, be respectively arrayed along the tire circumferential direction D3. In addition, a constitution might be adopted in which buttress blocks(s) 4 are for example arranged at location(s) toward the exterior in the tire radial direction D2 from annular projection 3, and in which side block(s) 5 are for example arranged at location(s) toward the interior in the tire radial direction D2 from annular projection 3.

Note that whereas in the present embodiment the inner end in the tire radial direction D2 of buttress block 4 is contiguous with annular projection 3, it may for example be separated from annular projection 3. Furthermore, whereas in the present embodiment the outer end in the tire radial direction D2 of side block 5 is contiguous with annular projection 3, it may for example be separated from annular projection 3.

In addition, it is preferred for example that annular projection(s) 3, buttress block(s) 4, and side block(s) 5 be arranged at locations toward the exterior in the tire radial direction D2 from bead end location 22c (see FIG. 1). Furthermore, it is even more preferred, e.g., as is the case in the present embodiment, that annular projection(s) 3, buttress block(s) 4, and side block(s) 5 be arranged at locations toward the exterior in the tire radial direction D2 from tire maximum width location 22b (see FIG. 1).

As a result, on a snowy road or over muddy or sandy terrain or the like, when the weight of the vehicle causes tire 1 to sink such that it is buried under snow, mud, sand, and/or the like, annular projection(s) 3, buttress block(s) 4, and/or side block(s) 5 are able to come in contact with the ground, and when going over rocky terrain these are able to come in contact with irregular surfaces of rocks. That is, annular projection(s) 3, buttress block(s) 4, and side block(s) 5 come in contact with the ground under bad road conditions such as when on a snowy road or over muddy, sandy, or rocky terrain or the like.

In addition, when snow, mud, sand, or the like is, for example, subjected to shearing by annular projection(s) 3, buttress block(s) 4, and side block(s) 5, resistance due to such shearing will cause production of traction. Furthermore, for example, when annular projection(s) 3, buttress block(s) 4, and side block(s) 5 come in contact with rock, friction due to such contact will cause production of traction. Thus, when the vehicle is being driven on a snowy road or under bad road conditions, annular projection(s) 3, buttress block(s) 4, and side block(s) 5 permit improvement in performance with respect to traction.

Note that it is preferred, e.g., as is the case in the present embodiment, that annular projection(s) 3, buttress block(s) 4, and side block(s) 5 be arranged toward the interior in the tire radial direction D2 from tread surface 23a. This will make it possible for annular projection(s) 3, buttress block(s) 4, and side block(s) 5 to be made to not come in contact with the ground during normal travel on a flat road.

The positional relationships in the tire circumferential direction D3 among tread block(s) 2, buttress block(s) 4, and side block(s) 5 associated with the present embodiment will now be described with reference to FIG. 2. Note, however, that the positional relationships in the tire circumferential direction D3 among tread block(s) 2, buttress block(s) 4, and side block(s) 5 are not limited to the following constitution.

For example, first tread block 2a and second tread block 2b might be arrayed in order as one proceeds toward first circumferential direction side D31; and first buttress block 4a, second buttress block 4b, third buttress block 4c, and fourth buttress block 4d might be arrayed in order as one proceeds toward first circumferential direction side D31. Note that first and second buttress blocks 4a, 4b, and third and fourth buttress blocks 4c, 4d, may respectively be partitioned by partitioning grooves 2c of tread blocks 2.

In addition, it is also possible to adopt a constitution in which, for example, first buttress block 4a and first tread block 2a intersect a common first tire meridional plane S2, and second buttress block 4b and first tread block 2a intersect a common second tire meridional plane S3. Furthermore, it is also possible to adopt a constitution in which, for example, third buttress block 4c and second tread block 2b intersect a common third tire meridional plane S4, and fourth buttress block 4d and second tread block 2b intersect a common fourth tire meridional plane S5.

In contradistinction thereto, it is preferred that side block 5 respectively intersect second tire meridional plane S3 and third tire meridional plane S4. More specifically, it is preferred that side block 5 be arranged so as to intersect tire meridional planes S3, S4 which are respectively in common thereto with first and second tread blocks 2a, 2b which are adjacent in the tire circumferential direction D3.

This will make it possible to cause location(s) of edge(s) (e.g., edge(s) extending in the tire radial direction D2) of side block 5 to be misaligned in the tire circumferential direction D3 with respect to location(s) of edge(s) (e.g., edge(s) extending in the tire radial direction D2 of width groove(s) 23f) of tread block(s) 2. Accordingly, it will, for example, be possible to cause traction to be effectively produced everywhere along the tire circumferential direction D3.

The constitutions of side blocks 5 associated with the present embodiment will next be described with reference to FIG. 3 and FIG. 4. Note, however, that the constitutions of side blocks 5 are not limited to the following constitutions.

Figure 3:
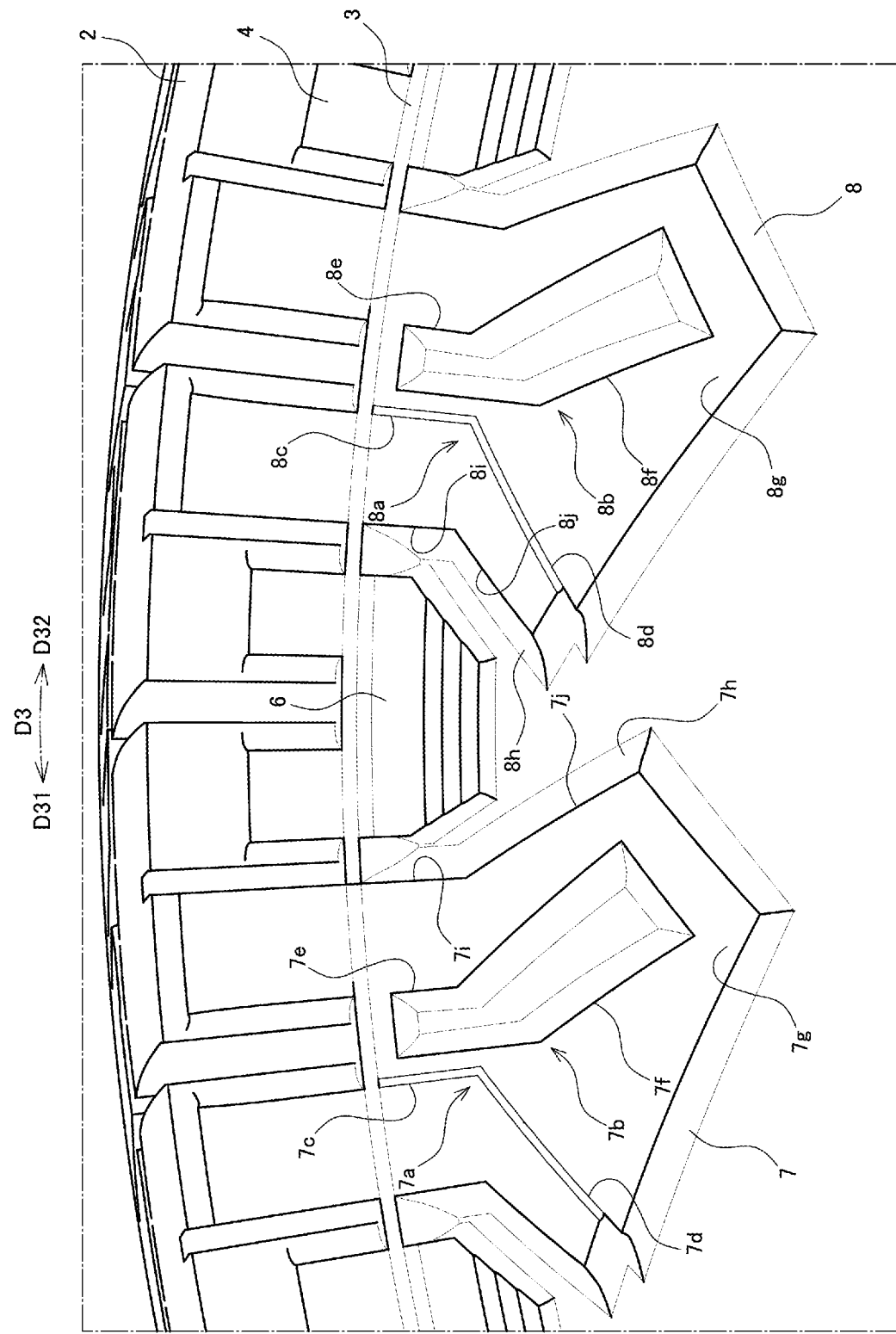
FIG. 3 is a side view of the principal components of a pneumatic tire associated with same embodiment.
Figure 4:
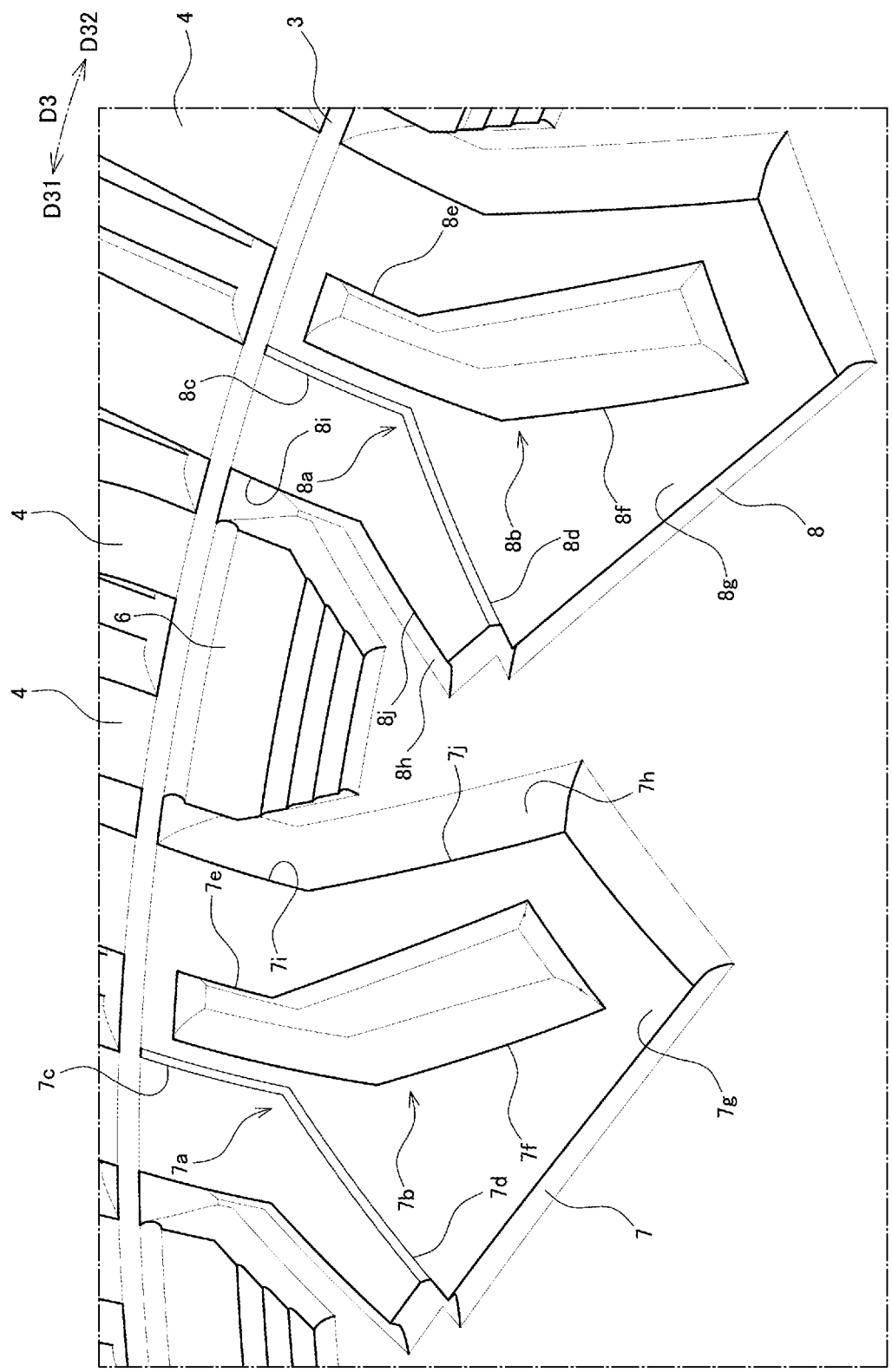
FIG. 4 is an enlarged view of the principal components at FIG. 2.

As shown in FIG. 3 and FIG. 4, side blocks 5 might, for example, comprise first side block 6, second side block 7 which is adjacent by way of an intervening gap to first side block 6 and which is disposed toward the first circumferential direction side D31 of first side block 6, and third side block 8 which is adjacent by way of an intervening gap to first side block 6 and which is disposed toward the second circumferential direction side D32 of first side block 6.

That is, third side block 8, first side block 6, and second side block 7 might be arrayed in continuous fashion as one proceeds toward the first circumferential direction side D31. Where this is the case, second side block 7 and third side block 8 will straddle first side block 6 in the tire circumferential direction D3.

It is, for example, preferred that the inner ends in the tire radial direction D2 of second and third side blocks 7, 8 be arranged toward the interior in the tire radial direction D2 from the inner end in the tire radial direction D2 of first side block 6. This will make it possible to effectively cause traction to be produced by region(s) in the tire radial direction D2 at which first side block(s) 6 are not present, i.e., region(s) toward the interior in the tire radial direction D2 from second and third side blocks 7, 8.

Moreover, the dimension(s) in the tire radial direction D2 of second and third side blocks 7, 8 might, for example, be larger than the dimension in the tire radial direction D2 of first side block 6. Because this will make it possible to increase length(s) of edge(s) at second and third side blocks 7, 8, this will, for example, make it possible to effectively cause traction to be produced by second and third side blocks 7, 8.

Furthermore, second and third side blocks 7, 8 might, for example, respectively comprise grooves 7a, 7b, 8a, 8b. Because this will make it possible to increase length(s) of edge(s) at second and third side blocks 7, 8, this will make it possible to even more effectively cause traction to be produced by second and third side blocks 7, 8.

Furthermore, second and third side blocks 7, 8 may, e.g., as is the case in the present embodiment, comprise first grooves 7a, 8a, and second grooves 7b, 8b which are wider than first grooves 7a, 8a. While there is no particular limitation with respect thereto, a constitution may be adopted in which, for example, widths of first grooves 7a, 8a are constant everywhere along the lengths thereof, but widths of second grooves 7b, 8b increase as one proceeds toward the interior in the tire radial direction D2.

First grooves 7a, 8a may, for example, comprise outer groove portions 7c, 8c which extend in the tire radial direction D2, and inner groove portions 7d, 8d which are increasingly directed toward the first circumferential direction side D31 as one proceeds toward the interior in the tire radial direction D2. Furthermore, second grooves 7b, 8b may, for example, comprise outer groove portions 7e, 8e which extend in the tire radial direction D2, and inner groove portions 7f, 8f which are increasingly directed toward the second circumferential direction side D32 as one proceeds toward the interior in the tire radial direction D2.

Because respective grooves 7a, 7b, 8a, 8b extend in bent fashion, this makes it possible to increase lengths of edges of respective grooves 7a, 7b, 8a, 8b. What is more, because inner groove portions 7d, 8d of first grooves 7a, 8a, and inner groove portions 7f, 8f of second grooves 7b, 8b, are inclined toward opposite sides in the tire circumferential direction D3, it will be possible to cause traction to be effectively produced by respective grooves 7a, 7b, 8a, 8b regardless of the direction of rotation of tire 1.

Furthermore, second side block 7 might, for example, comprise apex 7g which is formed so as to be flat, circumferentially lateral face 7h which is contiguous with the second circumferential direction side D32 of apex 7g, and end edge 7i which extends in the tire radial direction D2 and which is formed at the boundary between apex 7g and circumferentially lateral face 7h. Note that circumferentially lateral face 7h may respectively intersect and be contiguous with apex 7g and the outer surface of sidewall 22.

Furthermore, third side block 8 might, for example, comprise apex 8g which is formed so as to be flat, circumferentially lateral face 8h which is contiguous with the first circumferential direction side D31 of apex 8g, and end edge 8i which extends in the tire radial direction D2 and which is formed at the boundary between apex 8g and circumferentially lateral face 8h. Note that circumferentially lateral face 8h may respectively intersect and be contiguous with apex 8g and the outer surface of sidewall 22.

In addition, it is preferred, as is the case in the present embodiment, that the constitution be such that end edge 7i of second side block 7 comprises inclined portion 7j which is increasingly directed toward the second circumferential direction side D32 as one proceeds toward the interior in the tire radial direction D2, and such that end edge 8i of third side block 8 comprises inclined portion 8j which is increasingly directed toward the first circumferential direction side D31 as one proceeds toward the interior in the tire radial direction D2.

Because this will make it possible to increase the lengths of end edges 7i, 8i of second and third side blocks 7, 8, this will make it possible to cause traction to be effectively produced by end edges 7i, 8i of second and third side blocks 7, 8. What is more, where this is the case, inclined portions 7j, 8j of second and third side blocks 7, will become increasingly close to each other as one proceeds toward the interior in the tire radial direction D2. Accordingly, for example, inclined portions 7j, 8j will mutually cooperate to permit traction to be produced such as will surmount rocks, snow, mud, and so forth.

By thus, for example, increasing the dimension(s) in the tire radial direction D2 of second and third side blocks 7, 8 and/or causing second and third side blocks 7, 8 to comprise inclined portions 7j, 8j, it is possible to improve performance with respect to traction. But on the other hand, such constitution will result in increased tendency for rocks, snow, mud, and other such foreign objects to adhere between second and third side blocks 7, 8.

In this regard, the constitution of first side block 6 associated with the present embodiment will be described with reference to FIG. 5 through FIG. 7. Note, however, that the constitution of first side block 6 is not limited to the following constitution.

Figure 5:
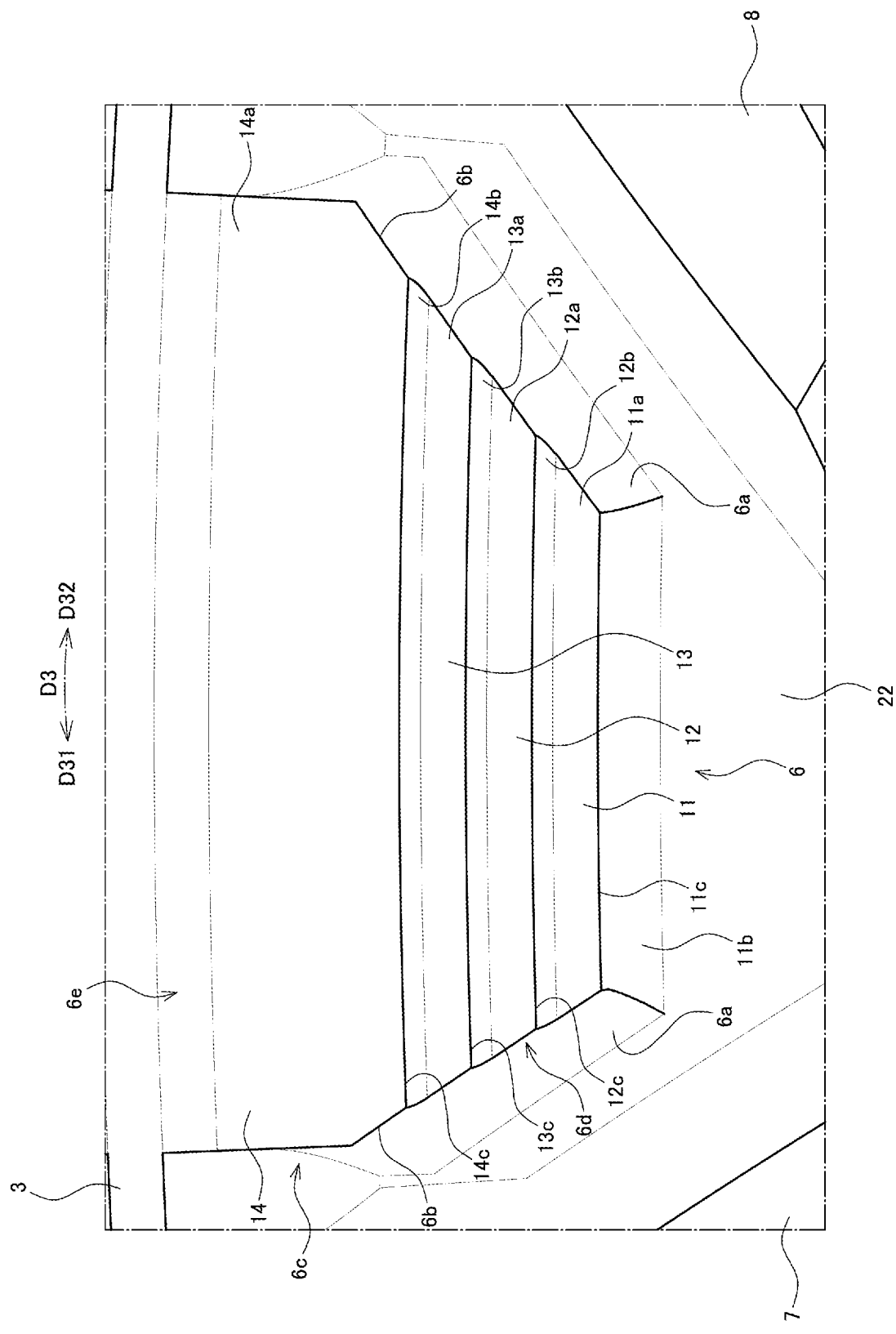
FIG. 5 is an enlarged view of the principal components at FIG. 3.
Figure 6:
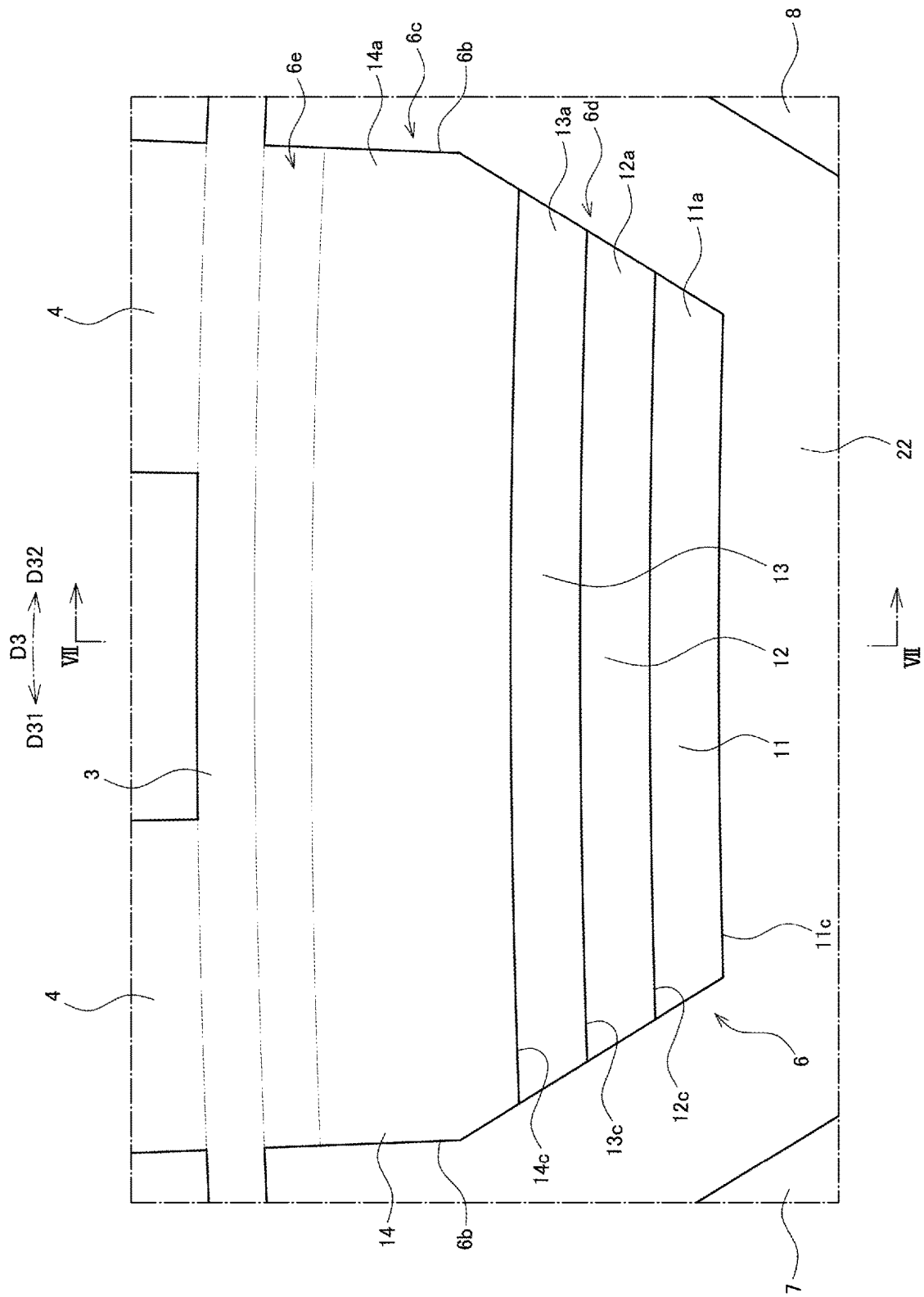
FIG. 6 is a front view of a first side block associated with same embodiment.

As shown in FIG. 5 and FIG. 6, first side block 6 might, for example, comprise first region 11, second region 12, third region 13, and fourth region 14 which are arranged in order in continuous fashion as one proceeds toward the exterior from an inwardmost location in the tire radial direction D2. In addition, first through third regions 11, 12, 13 may be arranged so as to extend in the tire circumferential direction D3.

Furthermore, it is preferred, for example, that respective regions 11, 12, 13, 14 comprise apices 11a, 12a, 13a, 14a which are formed so as to be flat; radially inward lateral faces 11b, 12b, 13b, 14b which are contiguous with locations toward the interior in the tire radial direction D2 of apices 11a, 12a, 13a, 14a; and radially inward end edges 11c, 12c, 13c, 14c which extend in the tire circumferential direction D3 and which are formed at the boundaries between apices 11a, 12a, 13a, 14a and radially inward lateral faces 11b, 12b, 13b, 14b.

In addition, it is preferred, e.g., as is the case in the present embodiment, that the constitution be such that second region 12 protrudes further than first region 11, third region 13 protrudes further than second region 12, and fourth region 14 protrudes further than third region 13. Where this is the case, first side block 6 will comprise stairway-like portions formed, for example, by first through fourth regions 11, 12, 13, 14.

More specifically, a step is formed between fourth region 14 and third region 13 such as will cause fourth region 14 to be of greater height, a step is formed between third region 13 and second region 12 such as will cause third region 13 to be of greater height, and a step is formed between second region 12 and first region 11 such as will cause second region 12 to be of greater height.

In addition, when tire 1 rotates and locations in the vicinity of first side block 6 make contact with the ground, respective radially inward end edges 11c, 12c, 13c, 14c of first through fourth regions 11, 12, 13, 14 will undergo deformation. As a result, respective radially inward end edges 11c, 12c, 13c, 14c will cause vibrations and so forth to be imparted to a foreign object that adheres between second and third side blocks 7, 8, i.e., a foreign object that adheres to first side block 6. Accordingly, this will permit removal of the foreign object that adheres to first side block 6.

Moreover, the constitution may be such that, more specifically, at first side block 6, second region 12 protrudes in a direction normal to apex 11a of first region 11 from first region 11, third region 13 protrudes in a direction normal to apex 12a of second region 12 from second region 12, and fourth region 14 protrudes in a direction normal to apex 13a of third region 13 from third region 13.

Furthermore, radially inward lateral face 11b of first region 11 may respectively intersect and be contiguous with apex 11a of first region 11 and the outer surface of sidewall 22. Furthermore, radially inward lateral face 12b of second region 12 may respectively intersect and be contiguous with aapex 11a of first region 11 and apex 12a of second region 12.

Furthermore, radially inward lateral face 13b of third region 13 may respectively intersect and be contiguous with apex 12a of second region 12 and apex 13a of third region 13. Furthermore, radially inward lateral face 14b of fourth region 14 may respectively intersect and be contiguous with apex 13a of third region 13 and apex 14a of fourth region 14.

In addition, first side block 6 might, for example, comprise circumferentially lateral faces 6a, 6a which are contiguous in the tire circumferential direction D3 with apices 11a, 12a, 13a, 14a of respective regions 11, 12, 13, 14; and circumferentially terminal edges 6b, 6b which extend in the tire radial direction D2 and which are formed at the boundaries between apices 11a, 12a, 13a, 14a and circumferentially lateral faces 6a, a. Note that circumferentially lateral faces 6a may respectively intersect and be contiguous with apices 11a, 12a, 13a, 14a of respective regions 11, 12, 13, 14 and the outer surface of sidewall 22.

Furthermore, first side block 6 might, for example, comprise outer region 6c which is arranged toward the exterior in the tire radial direction D2, and inner region 6d which is arranged toward the interior in the tire radial direction D2.

Note that outer region 6c and inner region 6d might be regions which partition first side block 6 such that the dimensions thereof in the tire radial direction D2 are the same. In addition, the dimension in the tire circumferential direction D3 of inner region 6d might, for example, decrease as one proceeds toward the interior in the tire radial direction D2. This will make it possible to decrease the rigidity of inner region 6d.

In contradistinction thereto, it is preferred that the constitution be such that the entireties of first through third regions 11, 12, 13 are respectively arranged within inner region 6d. Where this is the case, that fact that the entireties of first through third regions 11, 12, 13 are arranged within inner region 6d at which rigidity is low will make it possible to increase the amount of deformation at respective radially inward end edges 11c, 12c, 13c, 14c of first through fourth regions 11, 12, 13, 14. This will permit effective removal of foreign objects adhering to first side block 6.

Note that fourth region 14 may, as is the case in the present embodiment, be arranged so as to span inner region 6d and outer region 6c. While there is no particular limitation with respect thereto, the dimension in the tire circumferential direction D3 of outer region 6c might, for example, be constant. Furthermore, first side block 6 might, for example, comprise recess 6e which extends in the tire circumferential direction D3 at apex 14a of fourth region 14.

Figure 7:
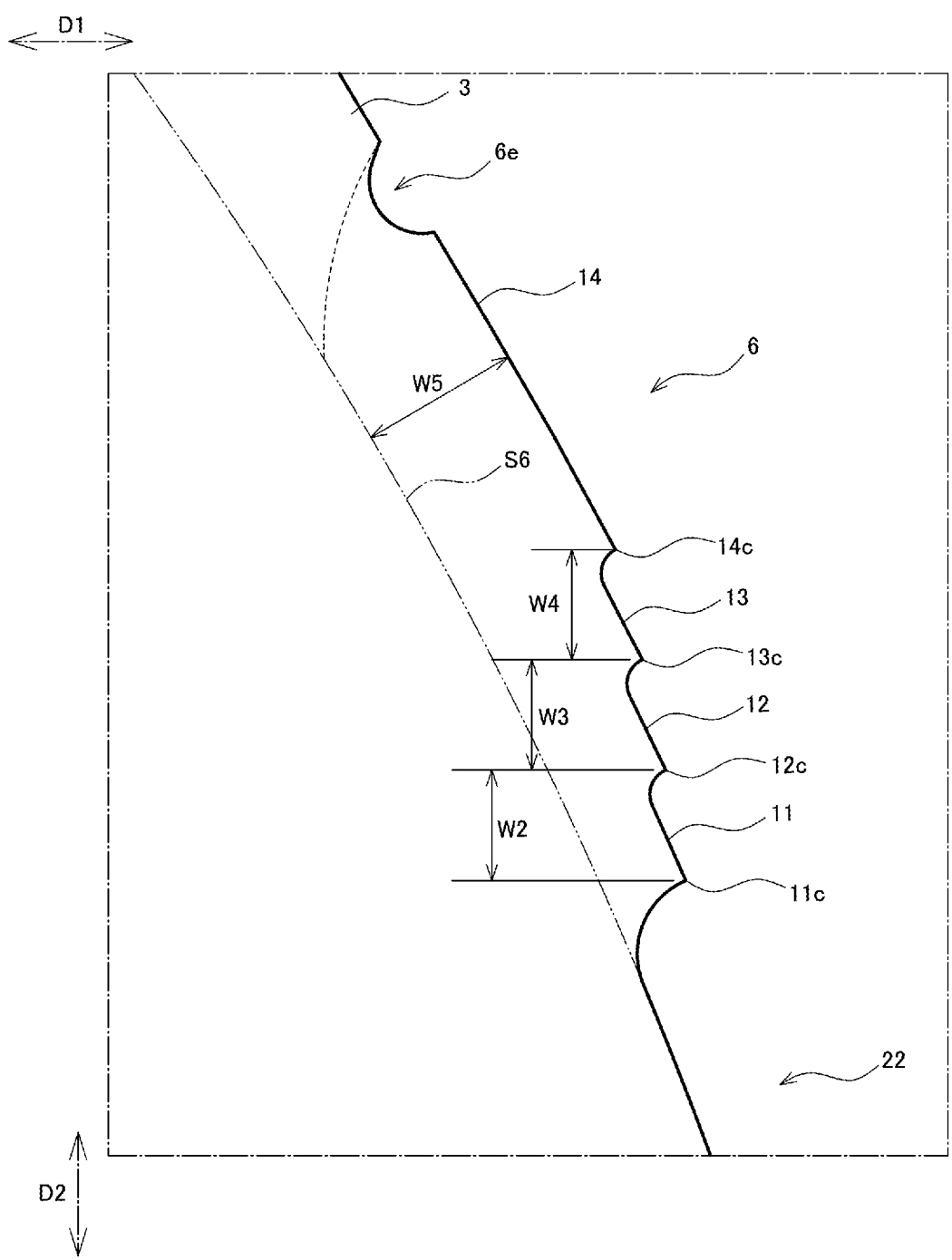
FIG. 7 is a sectional view of the principal components in a section taken along VII-VII in FIG. 6.

Furthermore, as shown in FIG. 7, it is preferred that the constitution be such that distance W2 in the tire radial direction D2 between radially inward end edges 11c, 12c of first and second regions 11, 12 is less than maximum protruding height W5 of first side block 6. Similarly, it is preferred that the constitution be such that distances W3, W4 in the tire radial direction D2 between radially inward end edges 12c, 13c, 14c of second through fourth regions 12, 13, 14 are respectively less than maximum protruding height W5 of first side block 6.

This will make it possible to decrease distances W2, W3, W4 between respective radially inward end edges 11c, 12c, 13c, 14c of first through fourth regions 11, 12, 13, 14. Accordingly, respective radially inward end edges 11c, 12c, 13c, 14c of first through fourth regions 11, 12, 13, 14 will cooperate to permit effective removal of foreign objects adhering to first side block 6.

Note, e.g., as is the case in the present embodiment, that maximum protruding height W5 of first side block 6 may be the maximum protruding height of fourth region 14. In addition, it is preferred that the constitution be such that the maximum protruding height of fourth region 14 is greater than the maximum protruding height of third region 13, the maximum protruding height of third region 13 is greater than the maximum protruding height of second region 12, and the maximum protruding height of second region 12 is greater than the maximum protruding height of first region 11.

Note that what is referred to as the protruding heights of first side block 6 and respective regions 11 through 14 might be taken to be the heights of protrusion thereof in a direction normal to profile surface S6 of sidewall 22. Furthermore, profile surface S6 of sidewall 22 might, for example, be made up of a plurality of arcs having differing radii of curvature in tire meridional sections S2 through S5.

Moreover, within the bounds of the region in the tire radial direction D2 at which first side block 6 is located, profile surface S6 of sidewall 22 may be made up of a single arc in tire meridional sections S2 through S5. In addition, said arc may be continuous with an arc of profile surface S6 at a portion adjacent and toward the interior in the tire radial direction D2 from first side block 6. At FIG. 7, the boundary between first side block 6 and annular projection 3 is shown in dashed line.

As described above, as in the present embodiment, it is preferred that a pneumatic 1 tire comprises a sidewall 22 extending in a tire radial direction D2;

wherein the sidewall 22 comprises a first side block 6 which protrudes outwardly in a tire axial direction D1;

wherein the first side block 6 comprises a first region 11 which is arranged at an inwardmost location in the tire radial direction D2 of the first side block 6, a second region 12 which is contiguous with a location toward an exterior in the tire radial direction D2 of the first region 11, and a third region 13 which is contiguous with a location toward an exterior in the tire radial direction D2 of the second region 12;

wherein the second region 12 protrudes more than the first region 11; and wherein the third region 13 protrudes more than the second region 12.

In accordance with such constitution, first region 11, second region 12, and third region 13 are arranged in order as one proceeds toward the exterior from an inwardmost location in the tire radial direction D2, these being third region 13, second region 12, and first region 11 in order of decreasing protruding height. As a result, radially inward end edges 11c, 12c, 13c will respectively be formed at the inner ends in the tire radial direction D2 of first through third regions 11, 12, 13.

In addition, when pneumatic tire 1 rotates and locations in the vicinity of first side block 6 make contact with the ground, because respective radially inward end edges 11c, 12c, 13c of first through third regions 11, 12, 13 undergo deformation, respective radially inward end edges 11c, 12c, 13c cooperate to permit removal of foreign objects adhering to first side block 6. This makes it possible to suppress occurrence of situations in which foreign objects might otherwise continue to adhere to side blocks 6, 7, 8.

Further, as in the present embodiment, it is preferred that the pneumatic tire 1 includes a configuration in which:

the sidewall 22 further comprises a second side block which is adjacent at a first side D31 in a tire circumferential direction D3 to the first side block 6, and a third side block 8 which is adjacent at a second side D32 in the tire circumferential direction D3 to the first side block 6;

an inner end in the tire radial direction D2 of the second side block 7 is arranged toward an interior in the tire radial direction D2 from an inner end in the tire radial direction D2 of the first side block 6; and an inner end in the tire radial direction D2 of the third side block 8 is arranged toward the interior in the tire radial direction D2 from the inner end in the tire radial direction D2 of the first side block 6.

In accordance with such constitution, the inner ends in the tire radial direction D2 of second and third side blocks 7, 8 are respectively arranged toward the interior in the tire radial direction D2 from the inner end in the tire radial direction D2 of first side block 6. This makes it possible for traction to be effectively produced by region (s) toward the interior in the tire radial direction D2 from second and third side blocks 7, 8.

But on the other hand, to address the fact that this might increase the tendency for foreign objects to adhere between second and third side blocks 7, 8, first side block 6 is arranged between second and third side blocks 7, 8. As a result, when a foreign object adheres between second and third side blocks 7, 8, it will be possible for the foreign object to be removed by first side block 6.

Further, as in the present embodiment, it is preferred that the pneumatic tire 1 includes a configuration in which:

the second side block 7 comprises a first end edge 7i which is arranged at the second side D32 in the tire circumferential direction D3;

the first end edge 7i comprises a first inclined portion 7j which is increasingly directed toward the second side D32 in the tire circumferential direction D3 as one proceeds toward the interior in the tire radial direction D2;

the third side block 8 comprises a second end edge 8i which is arranged at the first side D31 in the tire circumferential direction D3; and the second end edge 8i comprises a second inclined portion 8j which is increasingly directed toward the first side D31 in the tire circumferential direction D3 as one proceeds toward the interior in the tire radial direction D2.

In accordance with such constitution, first inclined portion 7j and second inclined portion 8j become increasingly close to each other as one proceeds toward the interior in the tire radial direction D2. Accordingly, for example, first inclined portion 7j and second inclined portion 8j will cooperate to permit traction to be produced such as will surmount rocks, snow, mud, and so forth.

Further, as in the present embodiment, it is preferred that the pneumatic tire 1 includes a configuration in which:

the first side block 6 comprises an outer region 6c which is arranged toward the exterior in the tire radial direction D2, and an inner region 6d which is arranged toward the interior in the tire radial direction D2;

a dimension in the tire circumferential direction D3 of the inner region 6d decreases as one proceeds toward the interior in the tire radial direction D2; and the entireties of the first region 11 and the second region 12 are arranged within the inner region 6d.

In accordance with such constitution, because the dimension in the tire circumferential direction D3 of inner region 6d decreases as one proceeds toward the interior in the tire radial direction D2, it is possible to decrease the rigidity of inner region 6d. In addition, because the entireties of first region 11 and second region 12 are arranged within inner region 6d, there is an increased tendency for respective radially inward end edges 11c, 12c, 13c of first through third regions 11, 12, 13 to undergo deformation when locations in the vicinity of first side block 6 make contact with the ground. This will permit effective removal of foreign objects adhering to first side block 6.

Further, as in the present embodiment, it is preferred that the pneumatic tire 1 includes a configuration in which:

the first region 11 comprises a first radially inward end edge 11c extending in the tire circumferential direction D3 at an inner end of the first region 11 in the tire radial direction D2;

the second region 12 comprises a second radially inward end edge 12c extending in the tire circumferential direction D3 at an inner end of the second region 12 in the tire radial direction D2;

the third region 13 comprises a third radially inward end edge 13c extending in the tire circumferential direction D3 at an inner end of the third region 13 in the tire radial direction D2;

a distance W2 in the tire radial direction D2 between the first radially inward end edge 11c and the second radially inward end edge 12c is less than a maximum protruding height W5 of the first side block 6; and a distance W3 in the tire radial direction D2 between the second radially inward end edge 12c and the third radially inward end edge 13c is less than the maximum protruding height W5 of the first side block 6.

In accordance with such constitution, it is possible to decrease distances W2, W3 in the tire radial direction D2 between respective radially inward end edges 11c, 12c, 13c of first through third regions 11, 12, 13. As a result, cooperation of respective radially inward end edges 11c, 12c, 13c of first through third regions 11, 12, 13 will make it possible for foreign objects adhering to first side block 6 to be effectively removed therefrom when locations in the vicinity of first side block 6 make contact with the ground.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that first side block 6 comprises first through fourth regions 11, 12, 13, 14. However, pneumatic tire 1 is not limited to such constitution. That is, there is no particular limitation so long as there are not less than three regions arranged in order of decreasing protruding height as one proceeds toward the exterior from an inwardmost location in the tire radial direction D2 of first side block 6.

For example, a constitution may be adopted in which first side block 6 is made up of only first through third regions 11, 12, 13. Or a constitution may be adopted in which first region 11, second region 12, and third region 13, fourth region 14, and a fifth region are contiguous in order as one proceeds toward the exterior from an inwardmost location in the tire radial direction D2, these being the fifth region, fourth region 14, third region 13, second region 12, and first region 11 in order of decreasing protruding height.

(2) Furthermore, the constitution of pneumatic tire 1 associated with the foregoing embodiment is such that the inner ends in the tire radial direction D2 of second and third side blocks 7, 8 are arranged toward the interior in the tire radial direction D2 from the inner end in the tire radial direction D2 of first side block 6. However, pneumatic tire 1 is not limited to such constitution. For example, it is also possible to adopt a constitution in which at least one of the inner ends in the tire radial direction D2 of second and third side blocks 7, 8 is arranged toward the exterior in the tire radial direction D2 from the inner end in the tire radial direction D2 of first side block 6.

(3) Furthermore, the constitution of pneumatic tire 1 associated with the foregoing embodiment is such that the dimension in the tire circumferential direction D3 of inner region 6d decreases as one proceeds toward the interior in the tire radial direction D2, and the entireties of first region 11 and second region 12 are arranged within inner region 6d. However, pneumatic tire 1 is not limited to such constitution.

It is also for example possible to adopt a constitution in which the dimension in the tire circumferential direction D3 of inner region 6d is constant, and it is also for example possible to adopt a constitution in which this increases as one proceeds toward the interior in the tire radial direction D2. Furthermore, it is also possible to adopt a constitution in which, for example, the entirety of first region 11 is arranged within inner region 6d, and at least a portion of second region 12 is arranged within outer region 6c.

(4) Furthermore, the constitution of pneumatic tire 1 associated with the foregoing embodiment is such that distances W2, W3, W4 in the tire radial direction D2 between radially inward end edges 11c, 12c, 13c, 14c of first through fourth regions 11, 12, 13, 14 are less than maximum protruding height W5 of first side block 6. However, pneumatic tire 1 is not limited to such constitution. For example, it is also possible to adopt a constitution in which at least one of distances W2, W3, W4 in the tire radial direction D2 between radially inward end edges 11c, 12c, 13c, 14c of first through fourth regions 11, 12, 13, 14 is greater than maximum protruding height W5 of first side block 6.

(5) Furthermore, the constitution of pneumatic tire 1 associated with the foregoing embodiment is such that side blocks 5, 6, 7, 8 are arranged toward the interior in the tire radial direction D2 from annular projection 3. However, pneumatic tire 1 is not limited to such constitution. For example, a constitution may be adopted in which side block(s) 5, 6, 7, 8 are arranged toward the exterior in the tire radial direction D2 from annular projection 3. Furthermore, a constitution may be adopted in which, for example, sidewall 22 does not comprise at least one of annular projection 3 and buttress block 4.

The invention claimed is:

1. A pneumatic tire comprising a sidewall extending in a tire radial direction,
   wherein the sidewall comprises a first side block which protrudes outwardly in a tire axial direction from a surface of the sidewall,
   wherein the first side block comprises a first region which is arranged at an inwardmost location in the tire radial direction of the first side block, a second region which is contiguous with a location toward an exterior in the tire radial direction of the first region, a third region which is contiguous with a location toward an exterior in the tire radial direction of the second region, and a fourth region which is contiguous with a location toward an exterior in the tire radial direction of the third region,
   wherein the second region protrudes more than the first region,
   wherein the third region protrudes more than the second region,
   wherein the fourth region protrudes more than the third region,
   wherein the first region includes a first apex and a first lateral face connecting the first apex to the surface of the sidewall, the second region includes a second apex and a second lateral face connecting the second apex to the first apex, the third region includes a third apex and a third lateral face connecting the third apex to the second apex, and the fourth region includes a fourth apex and a fourth lateral face connecting the fourth apex to the third apex, and
   wherein the first side block further comprises:
      a first step formed by the first apex and the first lateral face to position the first region at a greater height than the surface of the sidewall;
      a second step formed by the second apex and the second lateral face to position the second region at a greater height than the first region;
      a third step formed by the third apex and the third lateral face to position the third region at a greater height than the second region; and
      a fourth step formed by the fourth apex and the fourth lateral face to position the fourth region at a greater height than the third region.

2. The pneumatic tire according to claim 1 wherein
   the sidewall further comprises a second side block which is adjacent at a first side in a tire circumferential direction to the first side block, and a third side block which is adjacent at a second side in the tire circumferential direction to the first side block,
   an inner end in the tire radial direction of the second side block is arranged toward an interior in the tire radial direction from an inner end in the tire radial direction of the first side block, and
   an inner end in the tire radial direction of the third side block is arranged toward the interior in the tire radial direction from the inner end in the tire radial direction of the first side block.

3. The pneumatic tire according to claim 1 wherein
   the first side block comprises an outer region which is arranged toward the exterior in the tire radial direction, and an inner region which is arranged toward the interior in the tire radial direction,
   a dimension in the tire circumferential direction of the inner region decreases as one proceeds toward the interior in the tire radial direction, and
   the entireties of the first region and the second region are arranged within the inner region.

4. The pneumatic tire according to claim 3 wherein the entireties of the first region, the second region, and the third region are arranged within the inner region.

5. The pneumatic tire according to claim 1 wherein
   the first region comprises a first radially inward end edge extending in the tire circumferential direction at an inner end of the first region in the tire radial direction,
   the second region comprises a second radially inward end edge extending in the tire circumferential direction at an inner end of the second region in the tire radial direction,
   the third region comprises a third radially inward end edge extending in the tire circumferential direction at an inner end of the third region in the tire radial direction,
   a distance in the tire radial direction between the first radially inward end edge and the second radially inward end edge is less than a maximum protruding height of the first side block, and
   a distance in the tire radial direction between the second radially inward end edge and the third radially inward end edge is less than the maximum protruding height of the first side block.

6. The pneumatic tire according to claim 5 wherein
   the first side block further comprises a fourth region which is contiguous with a location toward an exterior in the tire radial direction of the third region,
   the fourth region protrudes more than the third region,
   the fourth region comprises a fourth radially inward end edge extending in the tire circumferential direction at an inner end of the fourth region in the tire radial direction, and
   a distance in the tire radial direction between the third radially inward end edge and the fourth radially inward end edge is less than the maximum protruding height of the first side block.

7. The pneumatic tire according to claim 1 further comprising a tread that comes in contact with ground, wherein the tread comprises a plurality of width grooves which extend to an outer end in the tire axial direction, and a plurality of tread blocks which are partitioned by the plurality of width grooves, the plurality of tread blocks include first and second tread blocks which are adjacent in the tire circumferential direction, the first side block and the first tread block respectively intersect a common first tire meridional plane, and the first side block and the second tread block respectively intersect a common second tire meridional plane.

8. The pneumatic tire according to claim 7 wherein the sidewall comprises an annular projection that extends continuously in the tire circumferential direction along the entire length of the sidewall in the tire circumferential direction, and a plurality of buttress blocks which are arranged toward the exterior in the tire radial direction from the annular projection, the first side block is arranged toward the interior in the tire radial direction from the annular projection, the plurality of buttress blocks include first and second buttress blocks which are adjacent in the tire circumferential direction, the first side block and the first tread block and the first buttress block respectively intersect the common first tire meridional plane, and the first side block and the second tread block and the second buttress block respectively intersect the common second tire meridional plane.

9. The pneumatic tire according to claim 1 wherein the sidewall comprises an annular projection that extends continuously in the tire circumferential direction along the entire length of the sidewall in the tire circumferential direction, and at least one buttress block which is arranged toward the exterior in the tire radial direction from the annular projection, and the first side block is arranged toward the interior in the tire radial direction from the annular projection.

10. The pneumatic tire according to claim 2 wherein a dimension in the tire radial direction of the second side block is greater than a dimension in the tire radial direction of the first side block, and a dimension in the tire radial direction of the third side block is greater than the dimension in the tire radial direction of the first side block.

11. The pneumatic tire according to claim 2 wherein the second side block comprises a first groove, and a second groove which is wider than the first groove.

12. The pneumatic tire according to claim 11 wherein width of the second groove increases toward the interior in the tire radial direction.

13. A pneumatic tire comprising a sidewall extending in a tire radial direction, wherein the sidewall comprises a first side block which protrudes outwardly in a tire axial direction, the first side block comprises a first region which is arranged at an inwardmost location in the tire radial direction of the first side block, a second region which is contiguous with a location toward an exterior in the tire radial direction of the first region, and a third region which is contiguous with a location toward an exterior in the tire radial direction of the second region, the second region protrudes more than the first region, the third region protrudes more than the second region, the sidewall further comprises a second side block which is adjacent at a first side in a tire circumferential direction to the first side block, and a third side block which is adjacent at a second side in the tire circumferential direction to the first side block, an inner end in the tire radial direction of the second side block is arranged toward an interior in the tire radial direction from an inner end in the tire radial direction of the first side block, an inner end in the tire radial direction of the third side block is arranged toward the interior in the tire radial direction from the inner end in the tire radial direction of the first side block, the second side block comprises a first end edge which is arranged at the second side in the tire circumferential direction, the first end edge comprises a first inclined portion which is increasingly directed toward the second side in the tire circumferential direction as one proceeds toward the interior in the tire radial direction, the third side block comprises a second end edge which is arranged at the first side in the tire circumferential direction, and the second end edge comprises a second inclined portion which is increasingly directed toward the first side in the tire circumferential direction as one proceeds toward the interior in the tire radial direction.

14. A pneumatic tire comprising a sidewall extending in a tire radial direction, wherein the sidewall comprises a first side block which protrudes outwardly in a tire axial direction, the first side block comprises a first region which is arranged at an inwardmost location in the tire radial direction of the first side block, a second region which is contiguous with a location toward an exterior in the tire radial direction of the first region, and a third region which is contiguous with a location toward an exterior in the tire radial direction of the second region, the second region protrudes more than the first region, the third region protrudes more than the second region, the sidewall further comprises a second side block which is adjacent at a first side in a tire circumferential direction to the first side block, and a third side block which is adjacent at a second side in the tire circumferential direction to the first side block, an inner end in the tire radial direction of the second side block is arranged toward an interior in the tire radial direction from an inner end in the tire radial direction of the first side block, an inner end in the tire radial direction of the third side block is arranged toward the interior in the tire radial direction from the inner end in the tire radial direction of the first side block, the second side block comprises a first groove, and a second groove which is wider than the first groove, the first groove extends so as to be bent, and the second groove extends so as to be bent.

15. The pneumatic tire according to claim 14 wherein the first groove comprises a first outer groove portion which extends in the tire radial direction, and a first inner groove portion which is increasingly directed toward the first side in the tire circumferential direction as one proceeds toward the interior in the tire radial direction, and the second groove comprises a second outer groove portion which extends in the tire radial direction, and a second inner groove portion which is increasingly directed toward the second side in the tire circumferential direction as one proceeds toward the interior in the tire radial direction.

16. The pneumatic tire according to claim 14 wherein the third side block comprises a third groove, and a fourth groove which is wider than the third groove.

17. The pneumatic tire according to claim 16 wherein
width of the second groove increases toward the interior in the tire radial direction, and
width of the fourth groove increases toward the interior in the tire radial direction.

18. The pneumatic tire according to claim 16 wherein
the third groove extends so as to be bent, and
the fourth groove extends so as to be bent.

19. The pneumatic tire according to claim 18 wherein
the first groove comprises a first outer groove portion which extends in the tire radial direction, and a first inner groove portion which is increasingly directed toward the first side in the tire circumferential direction as one proceeds toward the interior in the tire radial direction,
the second groove comprises a second outer groove portion which extends in the tire radial direction, and a second inner groove portion which is increasingly directed toward the second side in the tire circumferential direction as one proceeds toward the interior in the tire radial direction,
the third groove comprises a third outer groove portion which extends in the tire radial direction, and a third inner groove portion which is increasingly directed toward the first side in the tire circumferential direction as one proceeds toward the interior in the tire radial direction, and
the fourth groove comprises a fourth outer groove portion which extends in the tire radial direction, and a fourth inner groove portion which is increasingly directed toward the second side in the tire circumferential direction as one proceeds toward the interior in the tire radial direction.

* * * * *